United States Patent [19]

Krauss

[11] Patent Number: 5,325,819
[45] Date of Patent: Jul. 5, 1994

[54] NON-CHOKING STRAIN-REDUCING DOG HARNESS

[75] Inventor: Mark J. Krauss, East Greenwich, R.I.

[73] Assignee: American Cord & Webbing Co., Inc., Woonsocket, R.I.

[21] Appl. No.: 141,115

[22] Filed: Oct. 21, 1993

[51] Int. Cl.$^5$ .................... A01K 15/00; A01K 27/00
[52] U.S. Cl. .................... 119/792; 119/856; 119/907
[58] Field of Search ............... 119/792, 793, 856, 905, 119/907, 864

[56] References Cited

U.S. PATENT DOCUMENTS

| | | | |
|---|---|---|---|
| 1,685,435 | 9/1928 | Philbrick | 119/907 X |
| 2,670,712 | 3/1954 | Patience et al. | 119/907 X |
| 3,769,939 | 11/1973 | Wais et al. | 119/907 X |
| 4,964,369 | 10/1990 | Sporn | 119/907 X |

FOREIGN PATENT DOCUMENTS

| | | | |
|---|---|---|---|
| 2142206 | 1/1973 | France | 119/907 |
| 2304284 | 10/1976 | France | 119/792 |
| 2201874 | 9/1988 | United Kingdom | 119/792 |

Primary Examiner—Gene Mancene
Assistant Examiner—Todd E. Manahan
Attorney, Agent, or Firm—Kane, Dalsimer, Sullivan, Kurucz, Levy, Eisele & Richard

[57] ABSTRACT

A dog harness has a collar having a front ring and rings at each of its free ends. A releasable buckle functions to releasably couple the collar free ends. A cord passes through the rings and forms a pair of loops for disposition in the foreleg pits of a dog. A ring and fastener at the cord free ends releasably couples these ends with the ring and is also adapted to be coupled with a leash. A strain on the leash and harness caused by the dog will exert pressure to the foreleg pits which will result in the dog reacting to decrease this pressure.

8 Claims, 2 Drawing Sheets

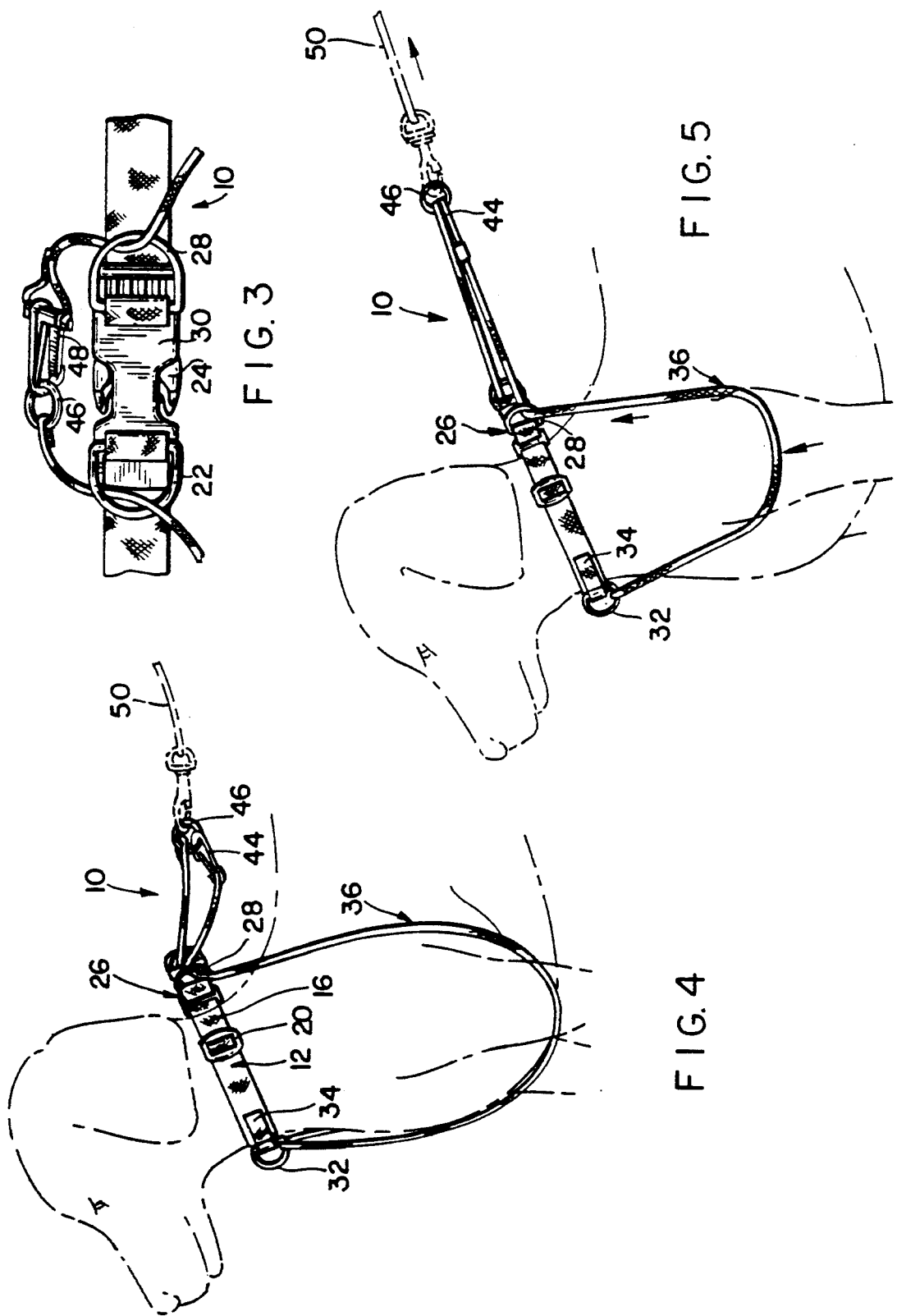

NON-CHOKING STRAIN-REDUCING DOG HARNESS

BACKGROUND OF THE INVENTION

The typical harness and collar for dogs when attached to a leash will cause the dog to choke when it strains against the leash. This adverse reaction on the part of the dog is undesirable and should be avoided. Attempts have been made to provide a non-choking type of harness, as for example, the harness disclosed in U.S. Pat. No. 4,964,369. While these prior art harnesses have proved effective, they did possess several shortcomings with respect to ease of attachment and manufacturing assembly.

OBJECTIVES AND SUMMARY OF THE INVENTION

A principal object of this invention is to improve upon the prior art non-choking and strain-reducing dog harness by providing a harness of this type that is more easily attached to the dog and is readily and relatively easily manufactured and assembled at low cost.

The harness of this invention is advantageously attached to a leash and inhibits the dog from straining against the leash and, at the same time, avoids any choking action. The harness includes a collar releasably attached to the neck of the dog by a releasable buckle. A single cord passes through D-rings at the male and female members of the buckle and through another D-ring located about midway between these buckle members attached to the collar to form a pair of loops. Each loop extends under the foreleg pits of the dog. The free ends of the cord have secured thereto an O-ring at one end and a latch at the other end. These ends are latched together after the buckle is latched and the leash is then attached to the O-ring. In this fashion, when the dog strains on the leash, the cord is tightened around the foreleg pits exerting a pressure thereon without choking the dog. This applied pressure will cause the dog to reduce the strain on the leash, and, consequently, the cord.

BRIEF DESCRIPTION OF THE DRAWINGS

The objects and advantages of the present invention will become apparent from the following detailed description of a preferred embodiment which is to be taken in conjunction with the accompanying drawings in which:

FIG. 3 is an enlarged fragmentary plan view showing the collar and cord buckled and fastened, respectively;

FIG. 4 is a side view of the harness of FIG. 1; and

FIG. 5 is another side view of the harness with a strain applied to the leash showing the tightening of the cord around the foreleg pits of the dog.

DETAILED DESCRIPTION OF PREFERRED EMBODIMENTS

Figure 2:
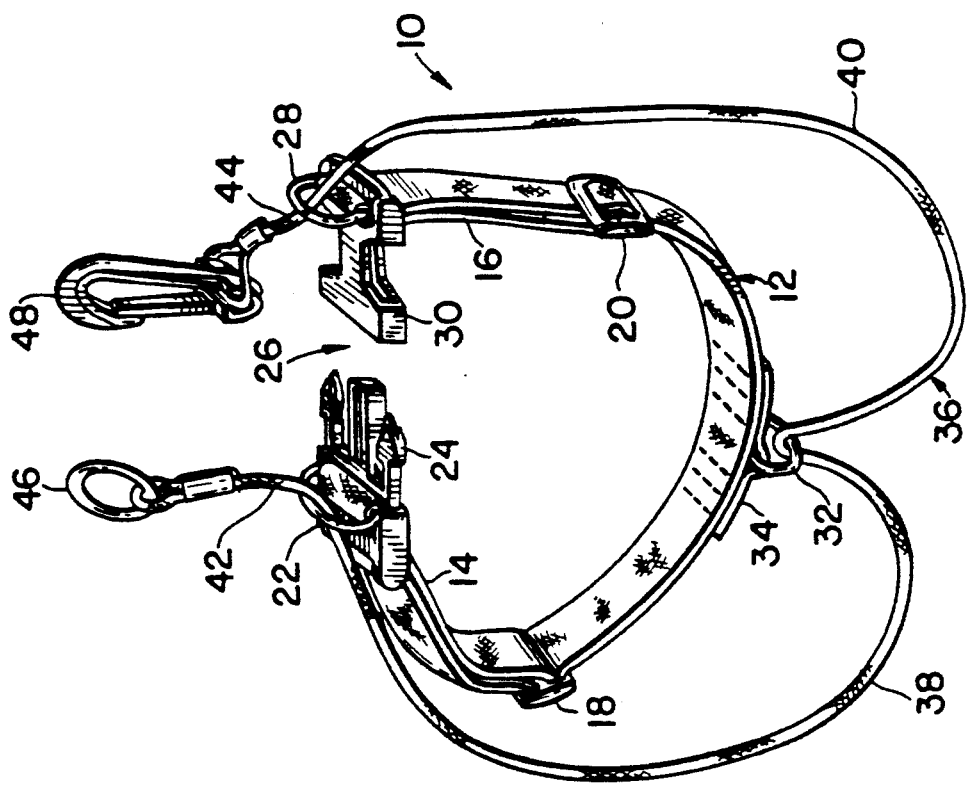
FIG. 2 is an enlarged perspective view of the harness having both the collar and cord unbuckled and unfastened, respectively.

In the drawings, a dog harness 10 includes a collar 12 adapted to be releasably applied to the neck of a dog. The free ends of the collar are formed with loops 14 and 16 and in a known manner pass through rings 18 and 20, respectively, and, reverse folded upon and attached by sewing to themselves to permit adjustment of the length of the collar to accommodate the size neck of the dog. Loop 14 passes through D-ring 22 and about the post of the male member 24 of releasable buckle 26. Loop 16 passes through D-ring 28 and about the post of female member 30 of buckle 26. At the midpoint of the exterior of the collar 12 is a D-ring 32 secured by a strip 34 sewn to the collar.

A cord 36 forms two loops 38 and 40 designed to fit under the foreleg pits of the dog. In this regard the cord passes through D-ring 32 and one free end 42 passes through D-ring 22 and the other free end 44 passes through D-ring 28. Free end 42 is looped around and secured to O-ring 46 while free end 44 is looped around and secured to fastener 48 which releasably fastens to the O-ring. This O-ring conveniently attaches to the leash 50.

Figure 1:
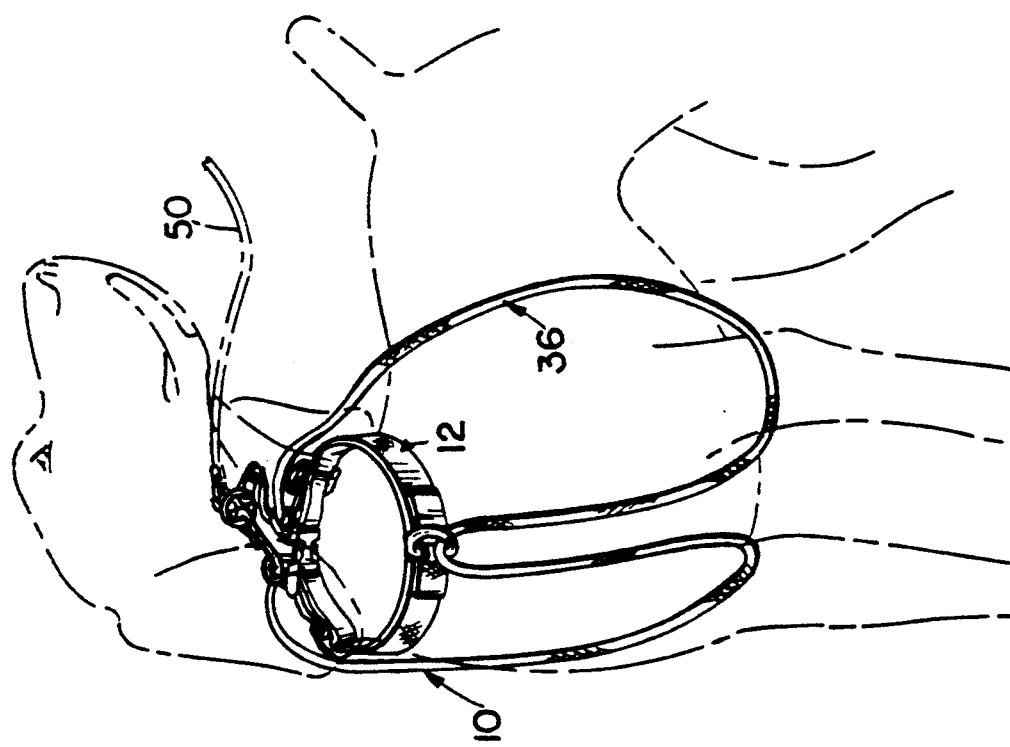
FIG. 1 is a perspective view of the harness of this invention applied to a dog and attached to a leash, both shown in phantom.

The harness 10 prior to attaching to a dog is shown in FIG. 2 with buckle 26 released and fastener 48 removed from O-ring 46. The forelegs of the dog are passed through loops 38 and 40 of cord 36 and these loops are disposed in the pits of the forelegs. The male member 24 of buckle 26 is inserted into the female member 30 to secure the collar about the neck of the dog. Where necessary the loops 14 and 16 may be adjusted to increase or decrease the lengths of the collar by manipulating and sliding the rings 18 and 20. The fastener 48 is latched to the O-ring 46 and the O-ring 46 is then latched to the leash 50. FIGS. 1, 4 and 5 illustrate the manner by which the harness is mounted on the dog with FIG. 3 showing the securement of the buckle 26 and the fastener 48 to O-ring 46. Obviously where more convenient or desirable the order of applying and securing the cord loops 38 and 40 and collar 12 as well as buckle 26 and fastener 48 to O-ring 46 may be changed. FIGS. 1 and 4 show the harness on the dog in a relatively unstrained state. However, when the harness is strained, as shown in FIG. 5 the cord loops 38 and 40 tighten about the foreleg pits of the dog. Experience has found that a dog does not tolerate this pressure too well and normally will react to release this pressure. Thus, the several aforementioned objects and advantages are most effectively attained. Although a single somewhat preferred embodiment of the invention has been disclosed and described in detail herein, it should be understood that this invention is in no sense limited thereby and its scope is to be determined by that of the appended claims.

I claim:

1. A dog harness adapted to be attached to a dog and coupled with a leash comprising:

a split collar having two ends for placing around the neck of a dog and having a front and a rear, a front ring attached to the front of the collar and a releasable buckle attached to the ends of the collar with a buckle male member attached to one end and a buckle female member attached to the other end, a rear ring attached to one end of the collar, and another rear ring attached to the other end of the collar adjacent the male member and female member, respectively, of the releasable buckle;

a single split cord passing through the front ring to form a pair of loops to be disposed within the foreleg pits of the dog, the cord having a pair of free ends, one cord free end passing through one rear ring and a further ring attached to this cord free end, the other cord free end passing through the other rear ring and a fastener attached to this free end for releasably attaching to the further ring, the further ring being adapted to couple with a leash; whereby when the leash and harness are unstrained the cord loops are loose and do not apply pressure to the foreleg pits of the dog, and when the leash and harness are strained, the cord loops apply pressure to the foreleg pits of the dog causing the dog to react to decrease the pressure.

2. The invention in accordance with claim 1 wherein the collar has means for adjusting the length thereof.

3. The invention in accordance with claim 2 wherein each end of the collar is looped and includes a slip ring for cooperating in adjusting the length of the collar.

4. The invention in accordance with claim 3 wherein the male member and female member of the buckle include posts and the loop at one end of the collar passes about the post of the male member and the loop at the other end of the collar passes about the post of the female member.

5. The invention in accordance with claim 4 wherein the loop at one end of the collar also passes through one of the rear rings and the loop at the other end of the collar also passes through the other of the rear rings.

6. The invention in accordance with claim 1 wherein the front and rear rings are D-rings.

7. The invention in accordance with claim 1 wherein a strip is sewn to the collar to attach the front ring thereto.

8. A dog harness adapted to be attached to a dog and coupled with a leash comprising:

a split collar having two ends for placing around the neck of a dog and having a front and a rear, a front ring on the front of the collar and a releasable buckle attached to the ends of the collar with a buckle male member attached to one end and a buckle female member attached to the other end, a rear ring means attached to the collar at an end thereof;

a single split cord passing through the front ring to form a pair of loops to be disposed within the foreleg pits of the dog, the cord having a pair of free ends passing through the rear ring means, and a further ring attached to one cord free end, and a fastener attached to the other free end for releasably attaching to the further ring;

whereby when the leash and harness are unstrained the cord loops are loose and do not apply pressure to the foreleg pits of the dog, and when the leash and harness are strained, the cord loops apply pressure to the foreleg pits of the dog causing the dog to react to decrease the pressure.

* * * * *